United States Patent [19]

Sears

[11] 4,115,942
[45] Sep. 26, 1978

[54] MESSAGE DISPLAY ARRANGEMENT FOR BICYCLE OR LIKE VEHICLE

[76] Inventor: Ernest L. Sears, 5111 Elmhurst Dr., Evansville, Ind. 47711

[21] Appl. No.: 769,651

[22] Filed: Feb. 17, 1977

[51] Int. Cl.² ............... B60Q 11/00; G09F 11/23
[52] U.S. Cl. ........................... 40/547; 40/590; 116/56
[58] Field of Search ............ 116/56, 124.4, 173; 280/289 R, 289 D; 340/134, 380; 40/129 C, 130 B; 350/97, 99; 240/58

[56] References Cited

U.S. PATENT DOCUMENTS

| | | | |
|---|---|---|---|
| 2,158,902 | 5/1939 | Gray | 350/99 |
| 2,488,021 | 11/1949 | May | 280/289 D |
| 3,029,553 | 4/1962 | Clemens | 116/56 X |
| 3,739,512 | 6/1973 | Ruppert | 116/124.4 |
| 3,812,815 | 5/1974 | Kuenzel | 116/173 X |
| 3,857,361 | 12/1974 | Gibson | 116/124.4 |
| 3,890,497 | 6/1975 | Rush | 280/289 R |
| 4,046,098 | 9/1977 | Mancinelli et al. | 350/99 X |

Primary Examiner—Daniel M. Yasich
Attorney, Agent, or Firm—Warren D. Flackbert

[57] ABSTRACT

A message display arrangement having particular adaptability for use on a wheeled vehicle, such as a bicycle, characterized by a display unit for presenting a succession of indicia information in response to the movement of the vehicle. Structure on a spoke of the vehicle wheel selectively rotates an indicia carrying segment wheel in front of a source of light, where the indicia pattern is transmitted to the display unit through a system of fiber optic strands.

4 Claims, 4 Drawing Figures

U.S. Patent  Sept. 26, 1978  4,115,942
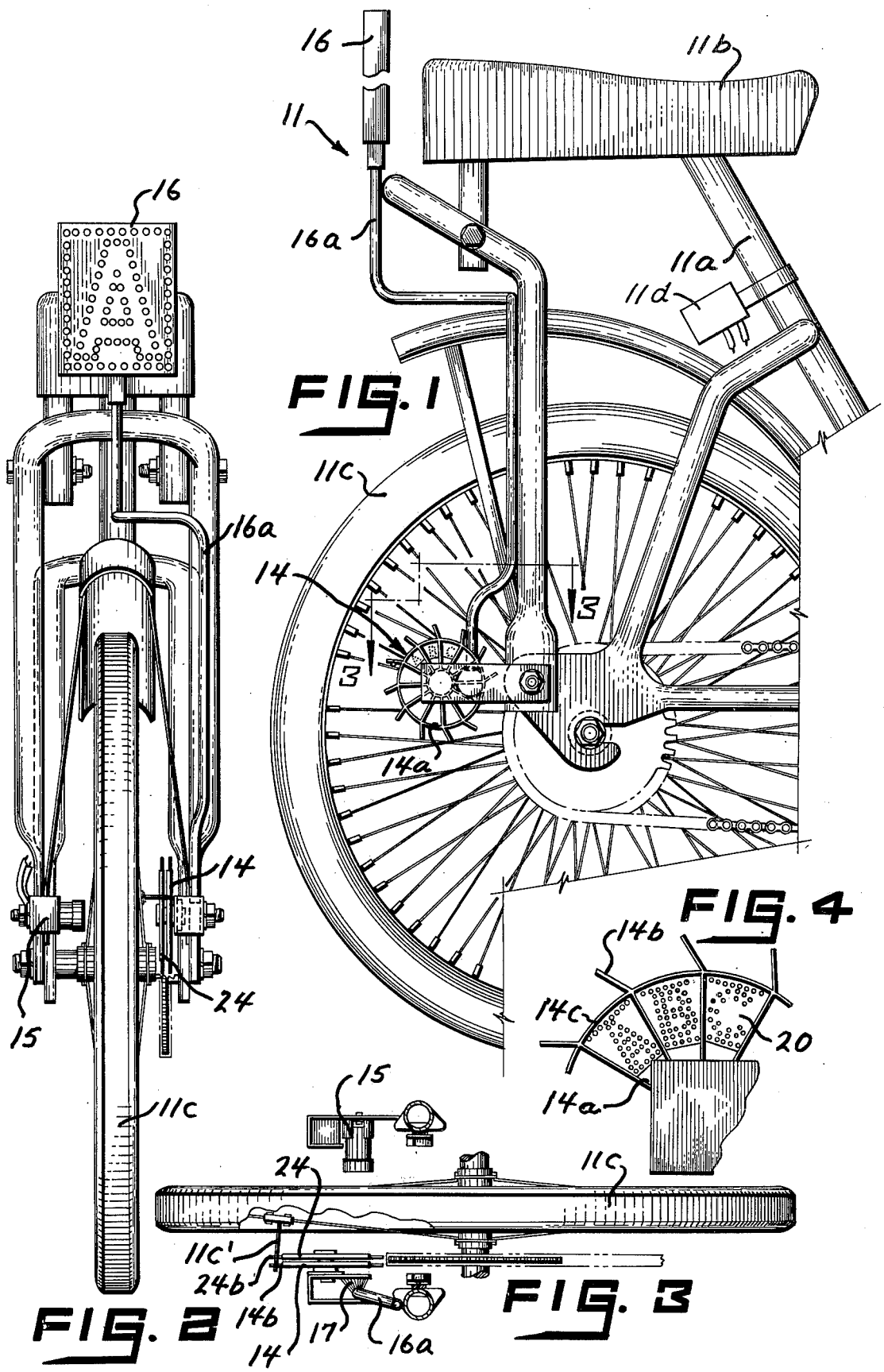

MESSAGE DISPLAY ARRANGEMENT FOR BICYCLE OR LIKE VEHICLE

As is known, the usage of fiber optic strands for light transmission is becoming quite widespread and encompasses a variety of applications. As is further known, the sale and use of bicycles is increasing and, therefore, an added need has arisen to provide maximum safety for the bicycle rider. The combination of fiber optic strands for bicycle safety purposes is deemed desirable.

The invention provides an arrangement which readily indicates the presence of a bicycle to motorists or others. A source of light is directed to a segment wheel into which indicia bearing members are selectively mounted. A system of fiber optic strands extends from the segment wheel to a message display unit typically mounted above the seat of the bicycle to provide ready visual recognizance. Various arrangements of indicia bearing members may be placed in the segment wheel, where the light passes through such members and transfers the indicia to the message display unit by means of the fiber optic strands.

Movement of the bicycle affords the selective rotation of the segment wheel, thereby achieving the transmitting of a continual message. In this connection, such a message might be the word "CAUTION", which is repeated as the bicycle moves. As an added feature, one or more colored lens might be employed in connection with the segment wheel, so that the resulting message is in color, as desired, to even further indicate the presence of the bicycle.

The message display arrangement of the invention is readily mounted on the bicycle and visually presents a desired word and/or message. The movement of the bicycle rotates the indicia carrying segment wheel for consecutive message presentation, and, as well, may generate energy for the light source.

A better understanding of the present invention will become more apparent from the following description, taken in conjunction with the accompanying drawing, wherein FIG. 1 is a view in elevation, partly fragmentary, showing the message display arrangement of the invention in connection with a bicycle;

FIG. 2 is another view in elevation, in this instance showing the invention as viewed when looking from left to right in FIG. 1;

FIG. 3 is a view in horizontal section, taken at line 3—3 on FIG. 1 and looking in the direction of the arrows, showing certain details of the segment wheel utilized in the invention; and, FIG. 4 is an enlarged fragmentary view of the segment wheel of FIG. 3.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now to the figures, the message display arrangement of the invention is shown in connection with a conventional bicycle 11, including a framework 11a with a seat 11b and a wire-spoked wheel 11c.

Broadly, the invention comprises an indicia carrying segment wheel 14, a source of light 15, a message display unit 16, and a system of fiber optic strands 17 extending from the segment wheel 14 to the message display unit 16.

The message display unit 16 is typically mounted behind the seat 11b of the bicycle 11. and the system of fiber optic strands 17 is contained within a tubular member 16a which supports the message display unit 16. The source of light 15, mounted on the framework 11a, may be powered by a generator (not detailed) operated through movement of the bicycle 11. A standard on-off switch (not shown) is provided for the light source 15.

Segment wheel 14 is rotatably mounted on the framework 11a, as well as, if desired, a color wheel 24. The segment wheel 14 includes a series of radial portions 14a into which indicia carrying members 20 are selectively received. The indicia carrying members 20 may be made from a plastic resin, where the desired indicia is represented by perforations or cut-outs in the appropriate pattern.

A series of pins 14b extend outwardly from the rim 14c of the segment wheel 14, each being adapted to be selectively and intermittently engaged by a member 11c' extending from one of the wire-spokes of the wheel 11c. In other words, as the wheel 11c rotates, the segment wheel 14 is rotated by the successive engagement of the member 11c' with a pin 14b.

Color wheel 24 is rotatably mounted on the framework 11a adjacent to the segment wheel 14, being driven in the same manner as the segment wheel 14, i.e. by the successive engagement of the member 11c' with a pin 24b extending from the rim thereof. The color wheel 24 may be one color or several colors. Use of the color wheel 24 is desirable to provide even more recognition to the message of the display unit 16.

In use, and as the bicycle 11 is propelled, the light emitted from the light source 15 passes through the color wheel 24 and the segment wheel 14 onto the ends of the system of fiber optic strands 17. The transmittal of light is in the pattern of the indicia on the segment wheel 14, and the same pattern appears at the opposite ends of the system of fiber optic strands 17 on the face of the message display unit 16.

It should be evident from the preceding that the invention effectively provides an arrangement for a visual message display, and one which affords added safety to the user of a bicycle. The message on the display unit may be readily changed by replacing the indicia carrying members 20. As stated, the resulting message may also be one color or several colors. A continual message is achieved through movement of the bicycle, and without any extra effort on the part of the operator.

The described message display arrangement is susceptible to various changes within the spirit of the invention as, for example, in proportioning, the particular mounting of the indicia carrying members, the type of light source, or the like. Thus, the preceding should be considered illustrative and not as limiting the scope of the following claims:

I claim:

1. A message display arrangement for a bicycle having a wheel-supported framework comprising light producing means mounted on said framework, a rotatable indicia carrying segment wheel mounted on a portion of said framework adjacent to said light producing means and positioned to pass light through said indicia, a message display unit mounted on said framework, and a system of fiber optic strands extending from the side of the segment wheel opposite to said light producing means to said message display unit transmitting light which passes through said indicia on said segment wheel to said message display unit, where a projection on a bicycle wheel selectively and intermittently engages one of a series of pins extending from said indicia carrying segment wheel to rotate the latter, said movement of said bicycle wheel providing a continual message on said message display unit.

2. The message display arrangement of claim 1 where a color wheel is mounted on said framework adjacent to said indicia carrying segment wheel, and where light from said light producing means passes through both said color wheel and said indicia on said segment wheel to said system of fiber optic strands.

3. The message display arrangement of claim 2 where said projection on said bicycle wheel which selectively rotates said indicia carrying segment wheel also selectively rotates said color wheel.

4. The message display arrangement of claim 1 where said bicycle has a seat, and where said message display unit extends above and behind said seat.

* * * * *